United States Patent
Carmona

(10) Patent No.: US 11,103,094 B2
(45) Date of Patent: Aug. 31, 2021

(54) AESTHETIC FASTENERS

(71) Applicant: Jonathan Henry Carmona, Huntington Beach, CA (US)

(72) Inventor: Jonathan Henry Carmona, Huntington Beach, CA (US)

(*) Notice: Subject to any disclaimer, the term of this patent is extended or adjusted under 35 U.S.C. 154(b) by 120 days.

(21) Appl. No.: 16/240,427

(22) Filed: Jan. 4, 2019

(65) Prior Publication Data

US 2019/0208931 A1 Jul. 11, 2019

Related U.S. Application Data

(60) Provisional application No. 62/614,713, filed on Jan. 8, 2018.

(51) Int. Cl.
| | | |
|---|---|---|
| *A47G 3/00* | (2006.01) | |
| *F16B 35/06* | (2006.01) | |
| *F16B 37/14* | (2006.01) | |
| *A47G 1/16* | (2006.01) | |
| *F16B 37/12* | (2006.01) | |

(52) U.S. Cl.
CPC .............. *A47G 3/00* (2013.01); *F16B 35/06* (2013.01); *F16B 37/125* (2013.01); *F16B 37/14* (2013.01); *A47G 1/1633* (2013.01)

(58) Field of Classification Search
CPC ........ A47G 3/00; A47G 1/162; A47G 1/1666; A47G 1/1633; A47G 1/168; A47G 1/1686; F16B 35/06; F16B 37/125; F16B 37/14; F16B 23/0084
USPC ................. 411/374, 546, 531, 397, 400, 401
See application file for complete search history.

(56) References Cited

U.S. PATENT DOCUMENTS

| | | | | |
|---|---|---|---|---|
| 205,990 | A * | 7/1878 | Armstrong | F16B 25/00 411/413 |
| 406,255 | A * | 7/1889 | Brinkerhoff | A47G 1/1633 248/493 |
| 954,924 | A * | 4/1910 | Brooks | G09F 7/18 40/668 |
| 1,059,326 | A * | 4/1913 | Ackermann | H01R 13/523 439/199 |

(Continued)

FOREIGN PATENT DOCUMENTS

| | | | | |
|---|---|---|---|---|
| EP | 3176446 | A1 * | 6/2017 | ............. F16B 12/00 |
| WO | WO-2012071625 | A1 * | 6/2012 | ........... E21D 21/008 |

OTHER PUBLICATIONS

NPL#1: Gyford Standoff Systems, Sign Standoff Caps & Barrels, Sep. 13, 2012, <https://www.youtube.com/watch?v=DTcYcpDjBoM> (Year: 2012).*

(Continued)

*Primary Examiner* — Victor D Batson
*Assistant Examiner* — Amit Singh Dhillon

(57) ABSTRACT

An aesthetic fastener is an innovated fastener that can accept an aesthetic cap or cover on the head of the fastener. The aesthetic fastener is similar to a regular screw but with a thicker and threaded head to receive the aesthetic cap or cover. Additionally, the aesthetic fastener comprises an attachment that allows the fastener to accept aesthetic caps or covers that are larger in diameter than the diameter of the head of the aesthetic fastener. Further, the aesthetic fastener includes an attachment that allows a user to easily hang items on to the aesthetic fastener with the aesthetic cap or cover on the aesthetic fastener.

7 Claims, 16 Drawing Sheets

(56) References Cited

U.S. PATENT DOCUMENTS

| | | | | |
|---|---|---|---|---|
| 1,675,282 | A * | 6/1928 | Strand | A47G 1/168 248/494 |
| 1,907,495 | A * | 5/1933 | Brunski | A47G 3/00 248/497 |
| 2,246,457 | A * | 6/1941 | Schultz | F16B 35/04 403/217 |
| 3,073,206 | A * | 1/1963 | Rudolph | F16B 23/0069 411/410 |
| 3,414,866 | A * | 12/1968 | Norden | H01R 4/34 439/586 |
| 3,451,362 | A * | 6/1969 | Welch | A47B 47/042 108/60 |
| 3,987,568 | A * | 10/1976 | Rosenberg | G09F 7/06 40/622 |
| 4,161,834 | A * | 7/1979 | Hendricks, Jr. | G09F 15/0006 40/606.09 |
| 4,723,866 | A * | 2/1988 | McCauley | E02D 29/1427 404/25 |
| 4,948,312 | A * | 8/1990 | Jochum | F16B 43/00 411/5 |
| 5,209,621 | A * | 5/1993 | Burbidge | F16B 13/0808 411/340 |
| 5,358,367 | A * | 10/1994 | Yang | F16B 33/00 411/389 |
| 5,397,092 | A * | 3/1995 | Black | A47G 1/215 248/490 |
| 5,626,245 | A * | 5/1997 | Kokenge | A47F 5/01 211/90.03 |
| 5,653,614 | A * | 8/1997 | Eschermann | F16B 41/002 439/813 |
| 6,086,035 | A * | 7/2000 | Trifilio | A47B 55/02 211/90.03 |
| 6,238,158 | B1 * | 5/2001 | Clements | F16B 37/14 411/372.6 |
| 6,321,623 | B1 * | 11/2001 | Dykes | B25B 13/065 411/402 |
| D552,976 | S * | 10/2007 | Gaudron | D8/387 |
| 7,506,464 | B2 * | 3/2009 | Tarter | G09F 7/00 40/596 |
| D606,853 | S * | 12/2009 | Shapiro | D8/397 |
| 7,713,013 | B2 * | 5/2010 | Sedgwick | F16B 23/0092 411/411 |
| 8,371,054 | B2 * | 2/2013 | Casterline | A47G 1/16 40/757 |
| 9,282,833 | B2 * | 3/2016 | Park | A47G 1/18 |
| 9,284,793 | B2 * | 3/2016 | D'Silva | H01R 39/385 |
| 2004/0067120 | A1 * | 4/2004 | Speer | F16B 1/0071 411/14 |
| 2005/0232724 | A1 * | 10/2005 | Selle | F16B 27/00 411/546 |
| 2010/0296892 | A1 * | 11/2010 | Rogers | F16B 37/14 411/8 |
| 2012/0141229 | A1 * | 6/2012 | Lalouf | A47G 1/16 411/393 |
| 2013/0108395 | A1 * | 5/2013 | Bourget | F16B 1/0071 411/373 |
| 2013/0269170 | A1 * | 10/2013 | Goldberg | G09F 7/18 29/525.02 |
| 2013/0336743 | A1 * | 12/2013 | Hill | F16B 37/14 411/372.6 |
| 2015/0055279 | A1 * | 2/2015 | McBroom | B25B 23/12 361/679.01 |
| 2016/0238056 | A1 * | 8/2016 | Ellingson | F16B 5/0275 |
| 2017/0295653 | A1 * | 10/2017 | Hernandez | F16B 35/041 |

OTHER PUBLICATIONS

NPL#2: Atlas Specialty Metals, Jul. 26, 2015, p. 1 (paragraph titled "which metals are magnetic?") <https://web.archive.org/web/20150726183320/h ttp://www.atlassteels.com.au/documents/TN11-Magnetic%20response%20rev%20Dec%202008.pdf> (Year: 2015).*

* cited by examiner

AESTHETIC FASTENERS

The current application claims a priority to the U.S. Provisional Patent application Ser. No. 62/614,713 filed on Jan. 8, 2018.

FIELD OF THE INVENTION

The present invention relates generally to fasteners. Specifically, the present invention is a fastener with an aesthetic cap or cover and with an attachment for hanging objects with the present invention.

BACKGROUND OF THE INVENTION

In the present society, many people conduct do-it-yourself, or DIY, projects at home. Many DIY projects, such as furniture making, require a user to utilize fasteners, usually screws. Most screws are versatile and efficient in holding the objects together. But no matter how easily screws are installed, or how well they hold, there is still the problem of aesthetics. Screw heads are a bit of an eyesore, at least on their own. The finished object such as a piece of furniture often contains an unaesthetic look with the exposed heads of the fasteners being visible on the external surfaces of the furniture. Additionally, countersinking—making a slightly larger hole, so the head of the screw goes beneath the surface of the furniture—does not help much either. What the user needs is better-looking fastener heads. Currently, there are no known means of methods of aesthetically covering the exposed heads of fasteners when screws are used to put or hold a piece of furniture together.

Further, when a screw is used to hang objects on a wall, the user normally needs to drill a hole through the drywall or drive the screw into a wood stud. Then the object is directly mounted to the wall using the screw or hung on the wall using an accessory such as a bracket, a clip, a hook, etc., which is mounted to the wall through the screw. If not mounted to a wood stud, the accessory is mounted to the drywall through a wall anchor. Many wall anchors are inserted to the drywall holding a screw, but most screws do not provide a direct means to hang the object.

Thus, an objective of the present invention is to provide the user with a fastener that is more aesthetically pleasing and an efficient means to hang objects thereon. The present invention offers an innovated fastener that can accept an aesthetic cover or cap to the head of the fastener. Additionally, the aesthetic fastener of the present invention provides the user with an attachment that allows the fastener to easily hang objects with the aesthetic cover or cap attached to the head of the fastener. Further, the present invention allows the user to apply other sizes of aesthetic cover or cap using an adaptor attached to the head of the fastener.

SUMMARY OF THE INVENTION

The present invention is an aesthetic fastener. The aesthetic fastener comprises an innovated fastener that can accept an aesthetic cap or cover on the threaded head of the fastener. The fastener is similar to a regular screw but with a thicker head to receive the aesthetic cap or cover. Additionally, the present invention includes an adaptor that allows the fastener to accept aesthetic caps or covers that are larger in diameter than the diameter of the head of the aesthetic fastener. Further, the present invention contains an attachment that allows a user to easily hang items on to the aesthetic fastener with the aesthetic cap or cover being attached to the aesthetic fastener.

DETAIL DESCRIPTIONS OF THE INVENTION

All illustrations of the drawings are for the purpose of describing selected versions of the present invention and are not intended to limit the scope of the present invention.

Figure 1:
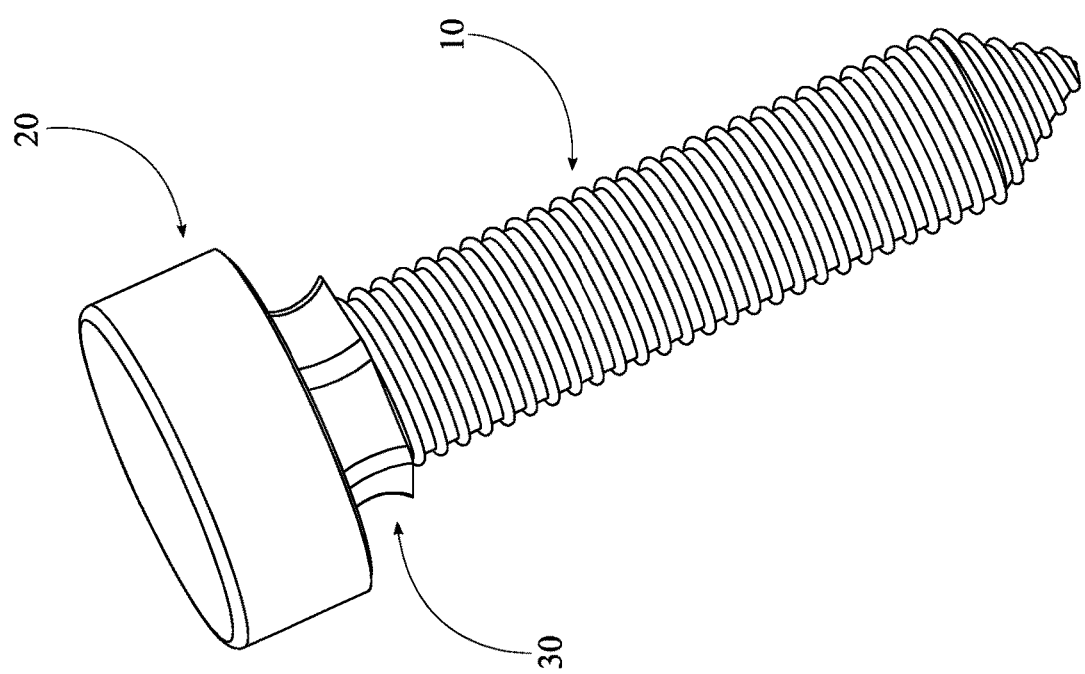
FIG. 1 is a perspective view of the present invention.
Figure 12:
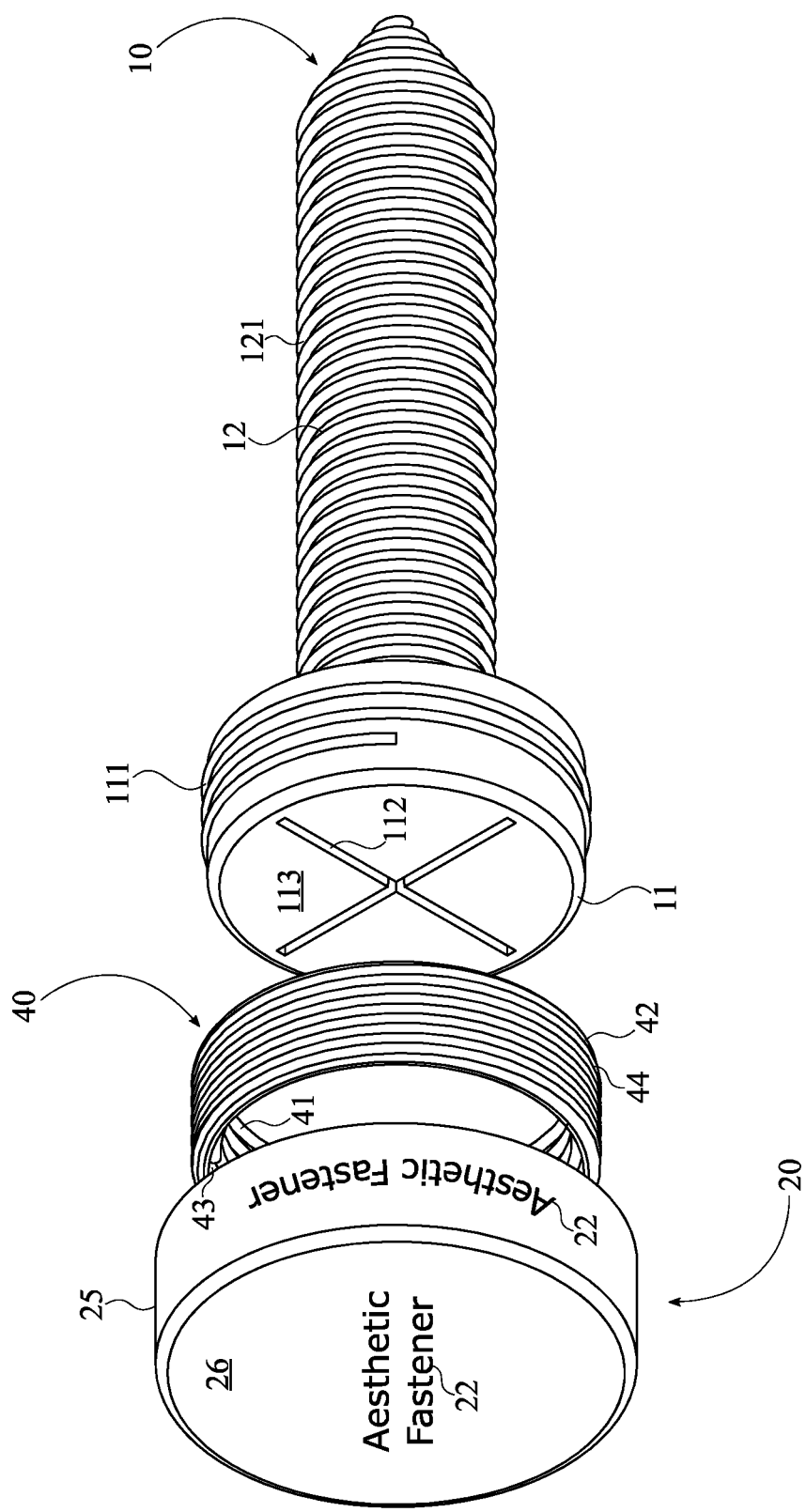
FIG. 12 is a blown-out perspective view of another embodiment of the present invention.
Figure 13:
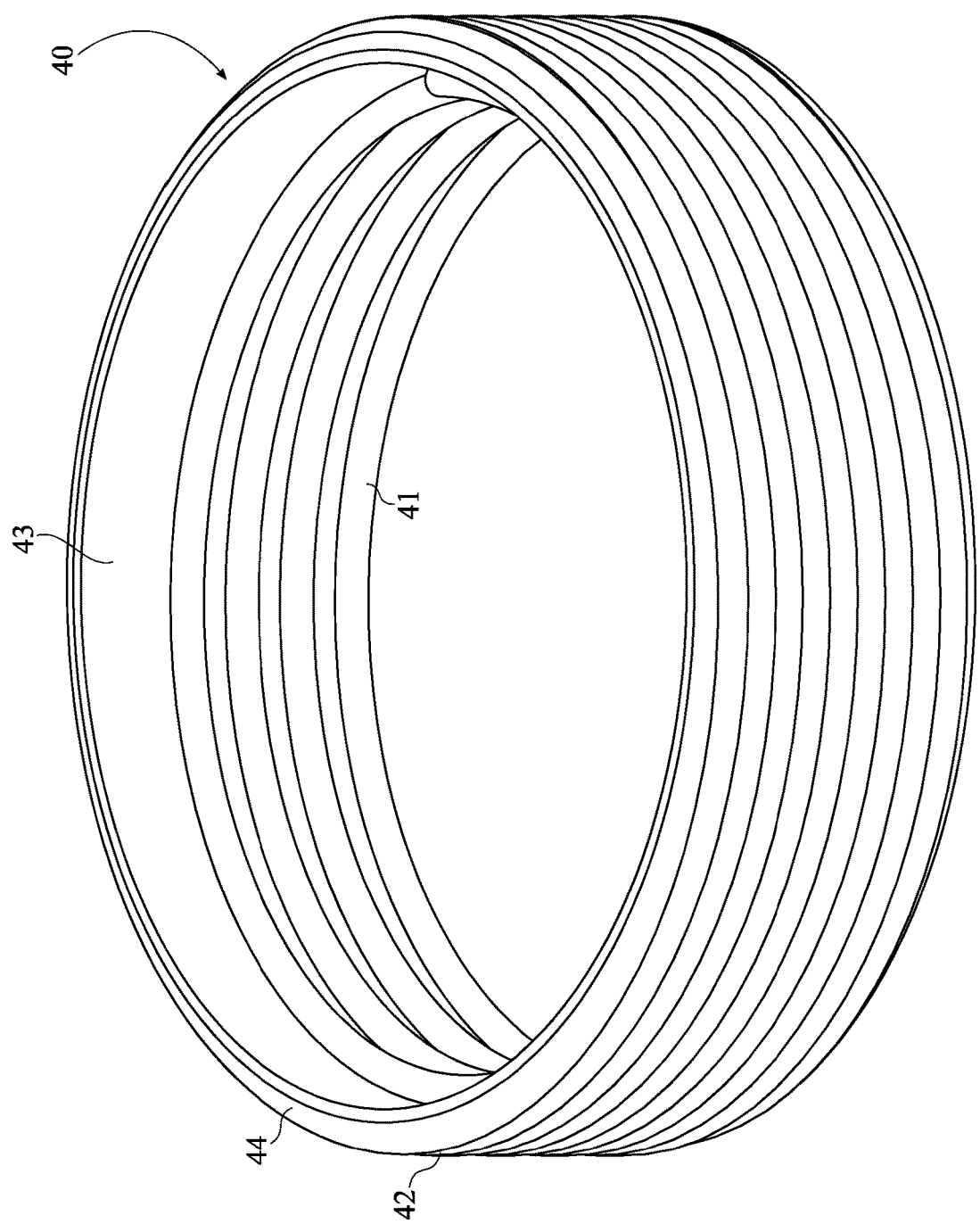
FIG. 13 is a perspective view of the adaptor of the present invention.
Figure 14:
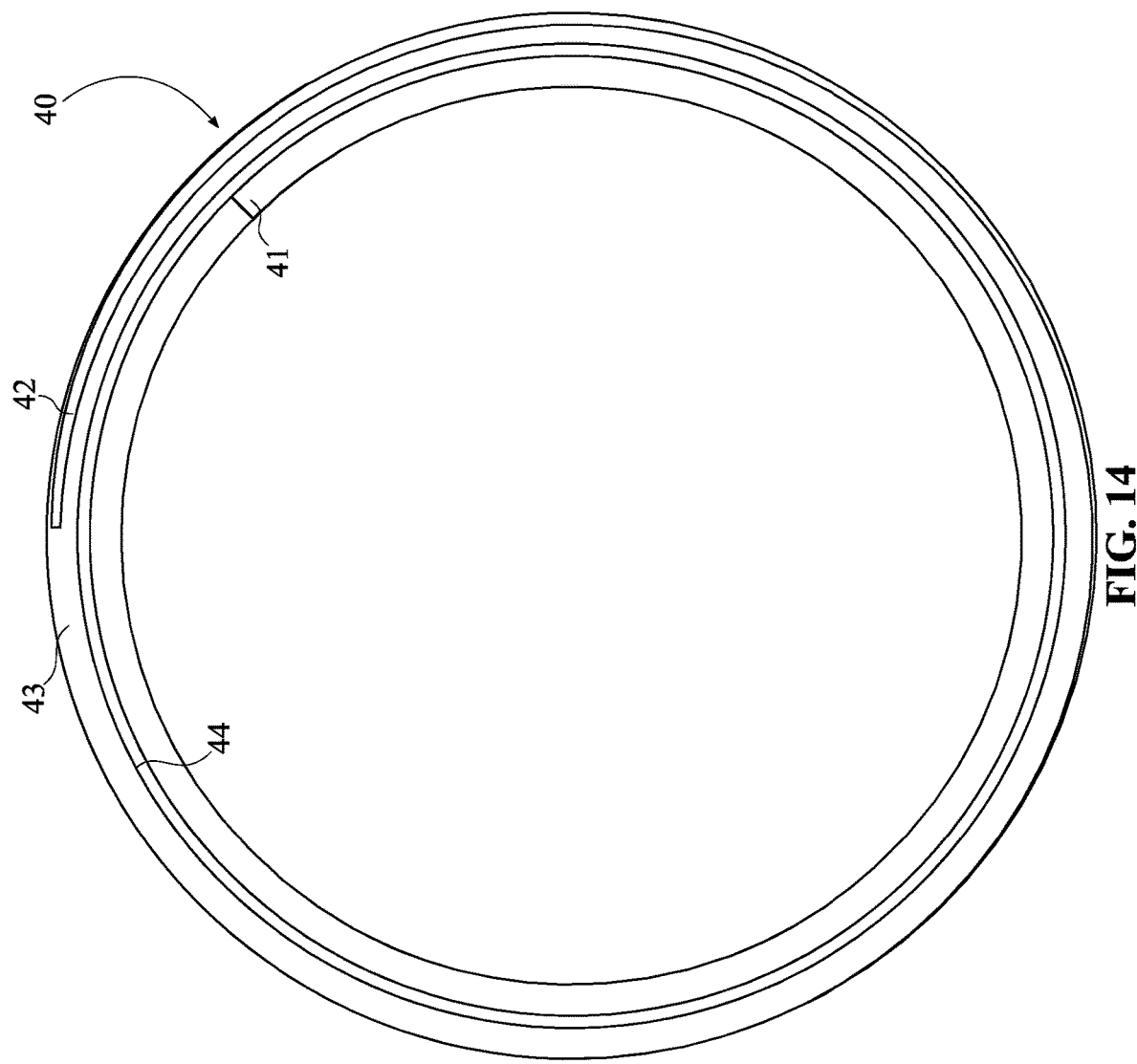
FIG. 14 is a top or bottom view of the adaptor of the present invention.
Figure 15:
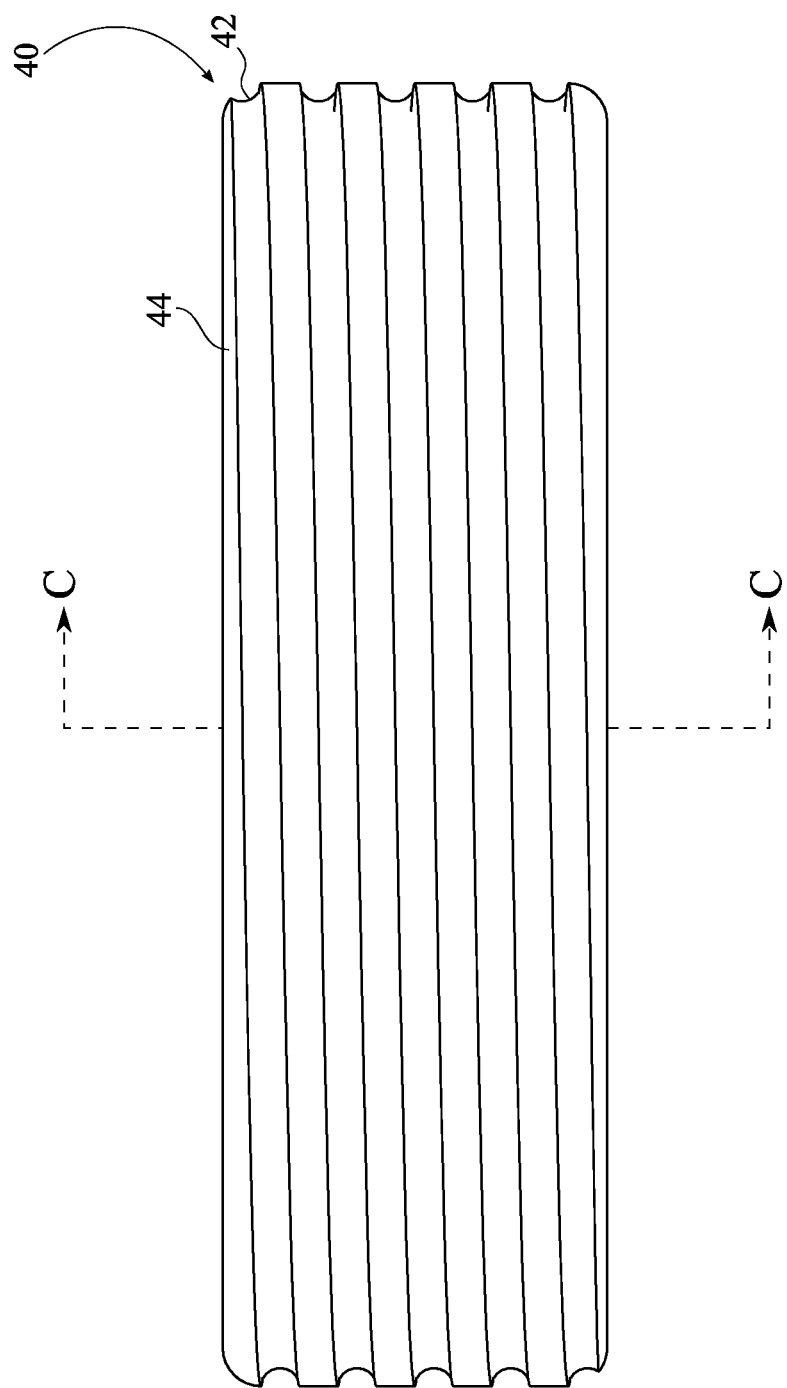
FIG. 15 is a front view of the adaptor of the present invention indicating the direction of section cut C.
Figure 16:
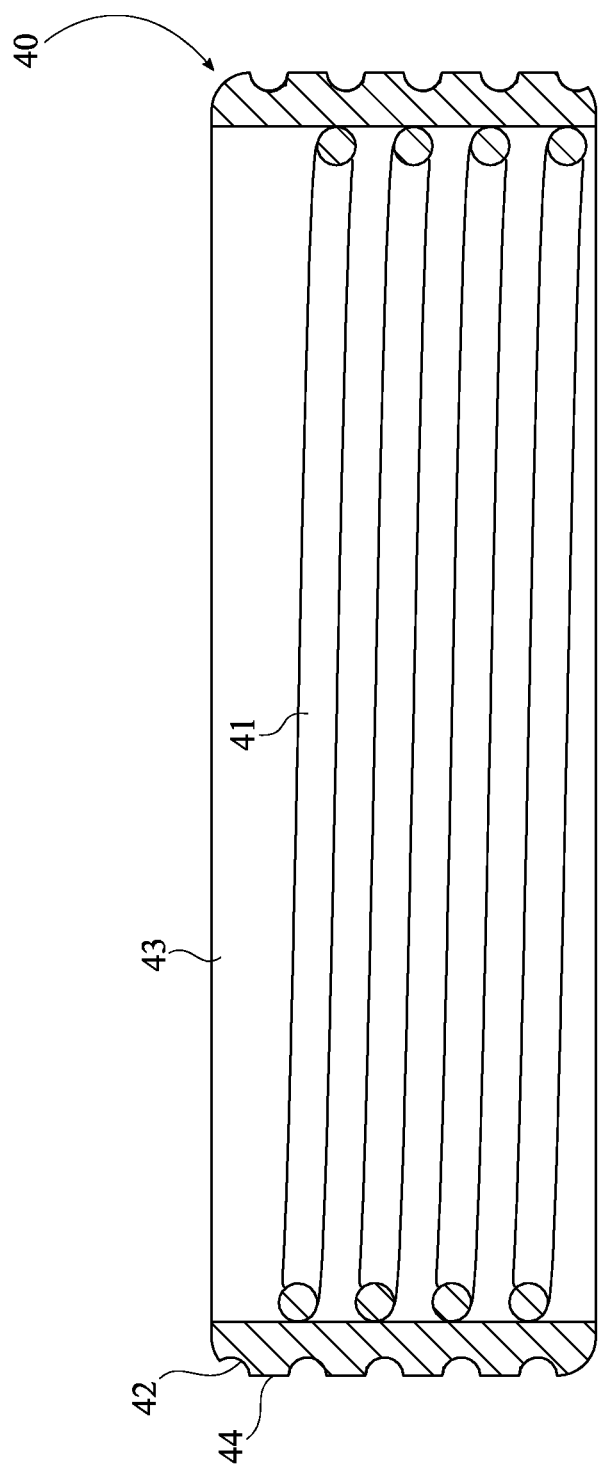
FIG. 16 is a left-side sectional view of the adaptor of the present invention taken along line C-C in FIG. 15.

As can be seen in FIG. 1 through FIG. 16, the present invention is an aesthetic fastener. The aesthetic fastener of the present invention can be of any shape, size, material or materials, features, type or kinds, components, and arrangements of components that would allow the present invention to fulfill the objects and intents of the present invention. In the preferred embodiment of the present invention, the aesthetic fastener is made of a material or materials that would allow the present invention to be durable, strong, non-toxic, weather resistant, easily manufacturable, and impervious. Additionally, it is preferred that the present invention be of a material or materials that would allow the present invention to easily interact with or be used with and/or on furniture, drywall, and other similar objects in which fasteners can be found on. Such materials can include, but is not limited to, wood, metal, plastic, or any other suitable materials. As can be seen in FIG. 1, the aesthetic fastener of the present invention comprises a screw 10, a cap 20, and a spacer 30. In an alternative embodiment of the present invention, the present invention can comprise an adaptor 40, as seen in FIG. 12.

As can be seen in FIG. 2 through FIG. 5, the present invention comprises the screw 10. The screw 10 of the present invention can be of any size, shape, material, features, type or kind, components, and arrangements of components that would allow the present invention to fulfill the objectives and intents of the present invention. However, it is preferred that the screw 10 of the present invention be of a type or kind similar to a Phillip-head styled screw or similar type of fastener in which a Phillip screwdriver would be utilized. In other embodiments of the present invention, the screw 10 can comprise other types of screw drives including, but not limited to, slot, hex, Allen, Torx (star), Robertson (square), 12-point flange, etc. It is preferred that the screw 10 be of a material similar to the material of the present invention. It is also preferred that the screw 10 be of a size and shape commonly found on fasteners used on furniture, and any other objects.

Figure 2:
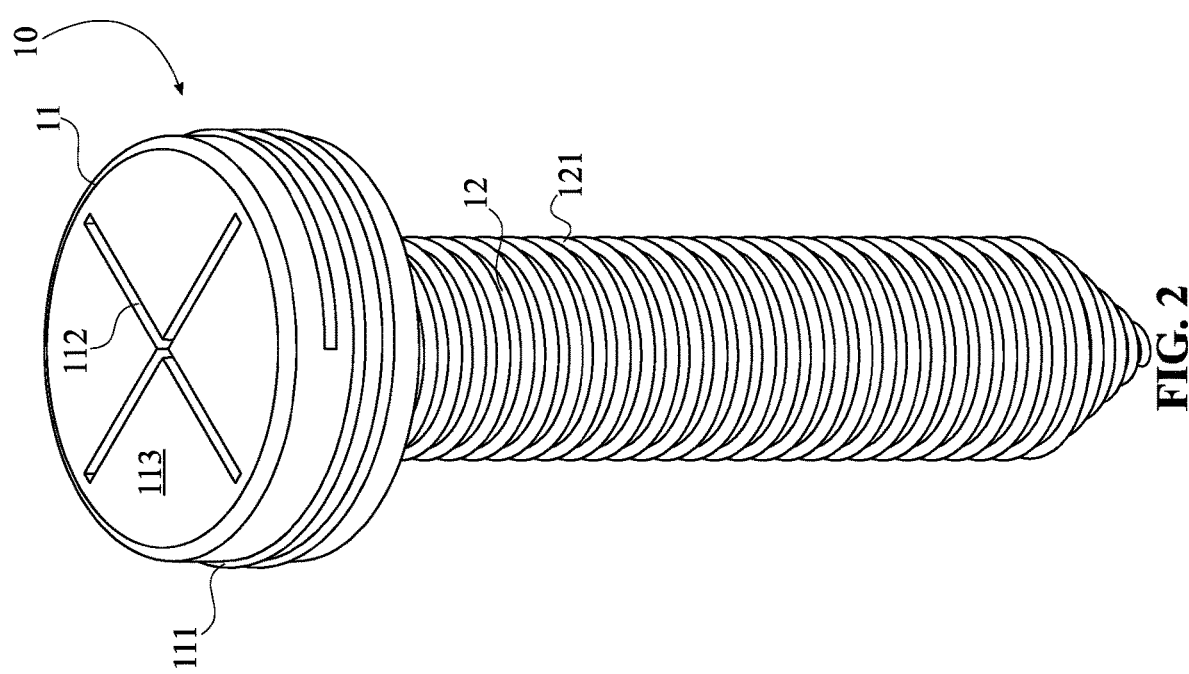
FIG. 2 is a perspective view of the screw of the present invention.
Figure 3:
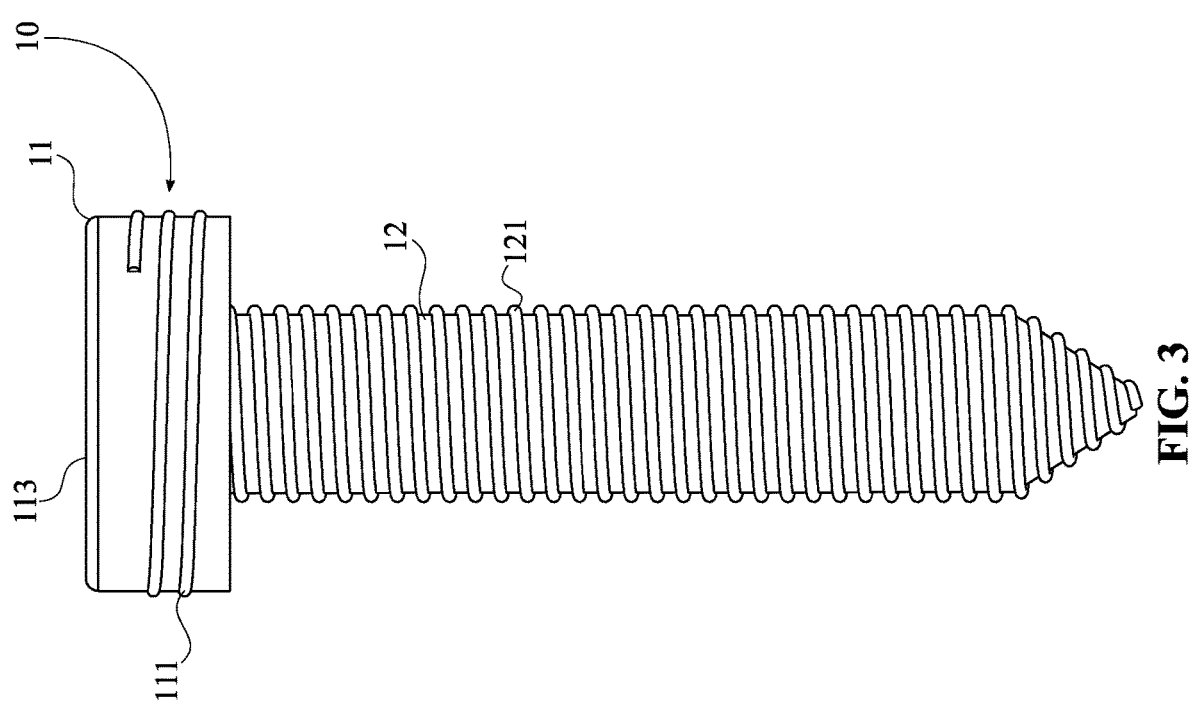
FIG. 3 is a front view of the screw of the present invention.
Figure 4:
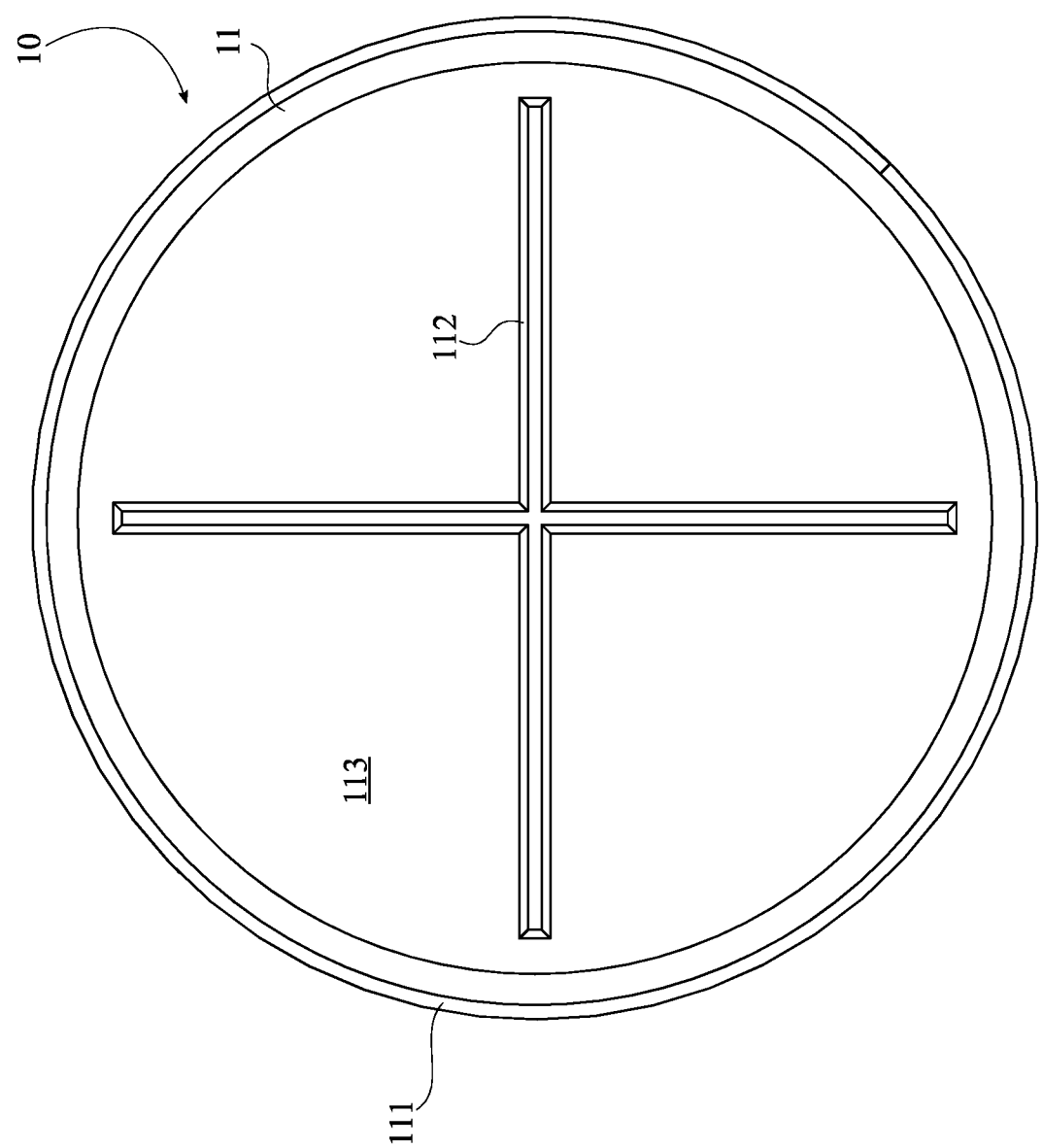
FIG. 4 is a top view of the screw of the present invention.
Figure 5:
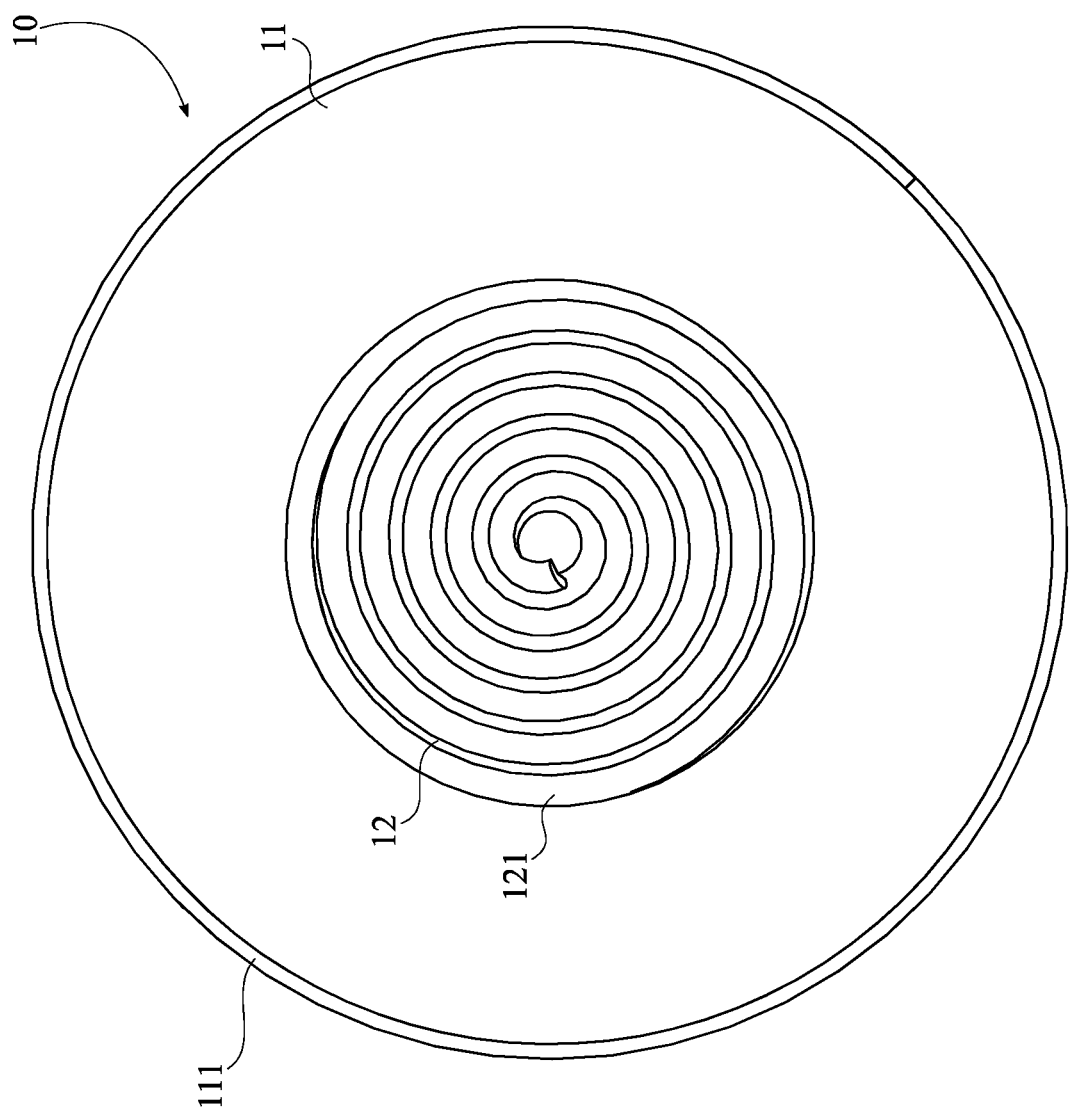
FIG. 5 is a bottom view of the screw of the present invention.

As can be seen in FIG. 2 and in FIG. 3, the screw 10 of the present invention comprises a head 11 and a shaft 12. The shaft 12 and head 11 of the screw 10 are terminally and concentrically connected to each other to form the main body of the aesthetic fastener of the present invention. The shaft 12 of the screw 10 can be of any shape, size, material, features, type or kind, components, and arrangements of components that would allow the present invention to fulfill the intents and objectives of the present invention. It is preferred that the shaft 12 is smaller in diameter than the head 11 of the screw 10. It is also preferred that the shaft 12 is of a similar material as the screw 10 of the present invention. The shaft 12 of the present invention comprises a first thread 121 along the length of the shaft 12. The first thread 121 can be of shape, size, features, type or kind, components, and arrangements of components that would allow the present invention to fulfill the objectives and intents of the present invention. However, the first thread 121 should be of a length that is equivalent to the length of the shaft 12.

As can be seen in FIG. 2 through FIG. 5, the screw 10 comprises the head 11. The head 11 of the screw 10 can be of any shape, size, material, features, type or kind, components, and arrangements of components that would allow the present invention to fulfill the intents and objectives of the present invention. However, it is preferred that the head 11 of the screw 10 be of a material similar to the screw 10 of the present invention. In other embodiments, the head 11 of the screw 10 includes a diameter that is larger than the diameter of heads of other screw-like fasteners, such that the cap 20 can be applied to the head 11 of the screw 10 of the present invention without the cap 20 falling off the head 11 due to gravity or other external forces. The head 11 of the screw 10 comprises a second thread 111, a screw drive 112 and a top face 113. The second thread 111 of the head 11 can be of any shape, size, material, features, type or kind, components, and arrangements of components that would allow the present invention to fulfill the intents and objectives of the present invention. However, it is preferred that the second thread 111 be of the size for engaging the cap 20 to the head 11 of the screw 10. The screw drive 112 of the head 11 can be of any shape, size, material, features, type or kind, components, and arrangements of components that would allow the present invention to fulfill the intents and objectives of the present invention. However, it is preferred that the screw drive 112 be positioned on the top face 113 of the head 11 and traverses into the top face 113. It is also preferred that the screw drive 112 be of a type or kind similar to a Phillip screw drive, although other types and kinds can be utilized such that the present invention fulfills the objects and intents of the present invention. Further, in other embodiments of the present invention, the head 11 of the screw 10 can be magnetic.

Figure 6:
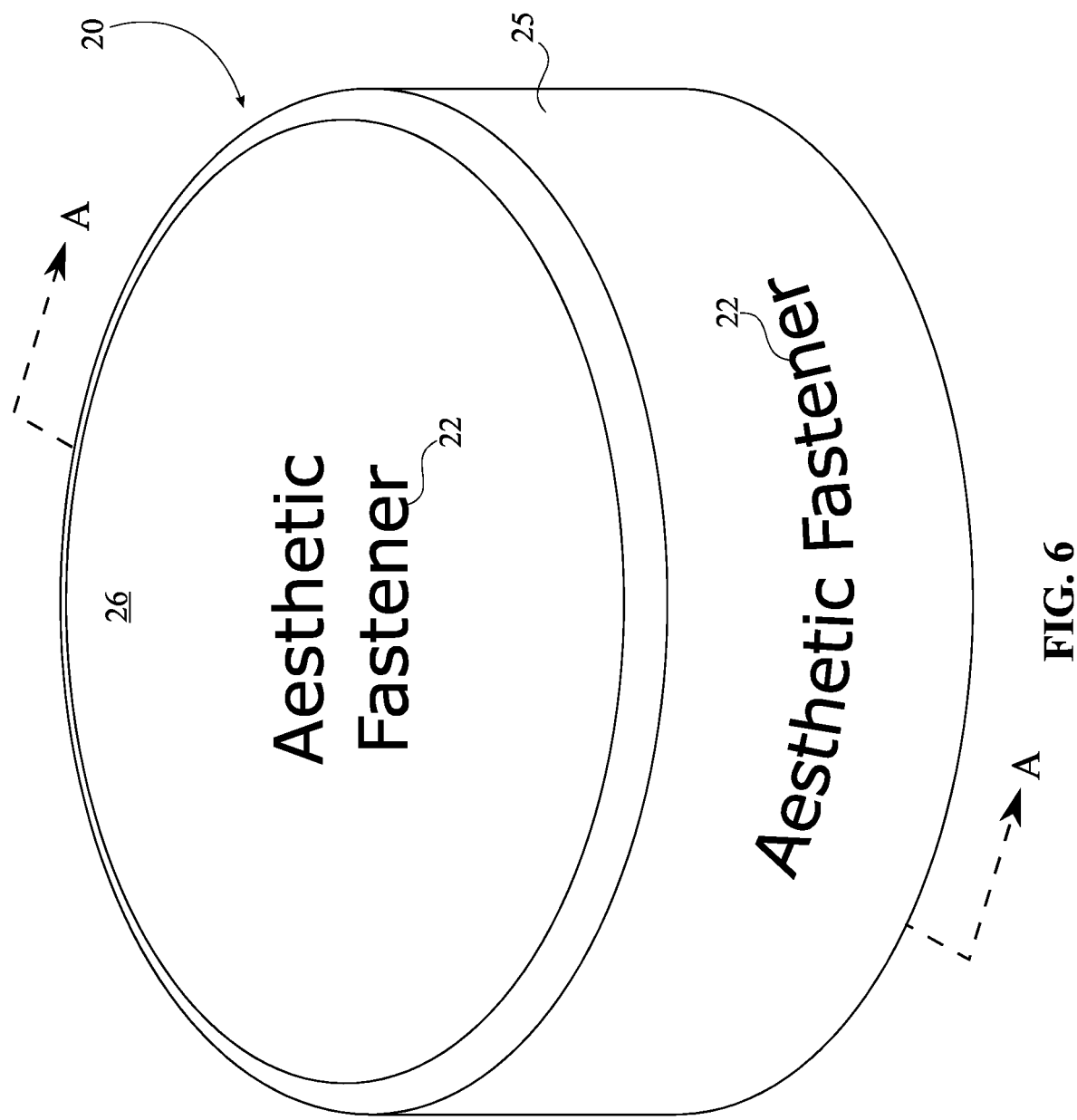
FIG. 6 is a perspective view of the cap of the present invention indicating the direction of section cut A and illustrating the embodiment of a plurality of illustrations.
Figure 7:
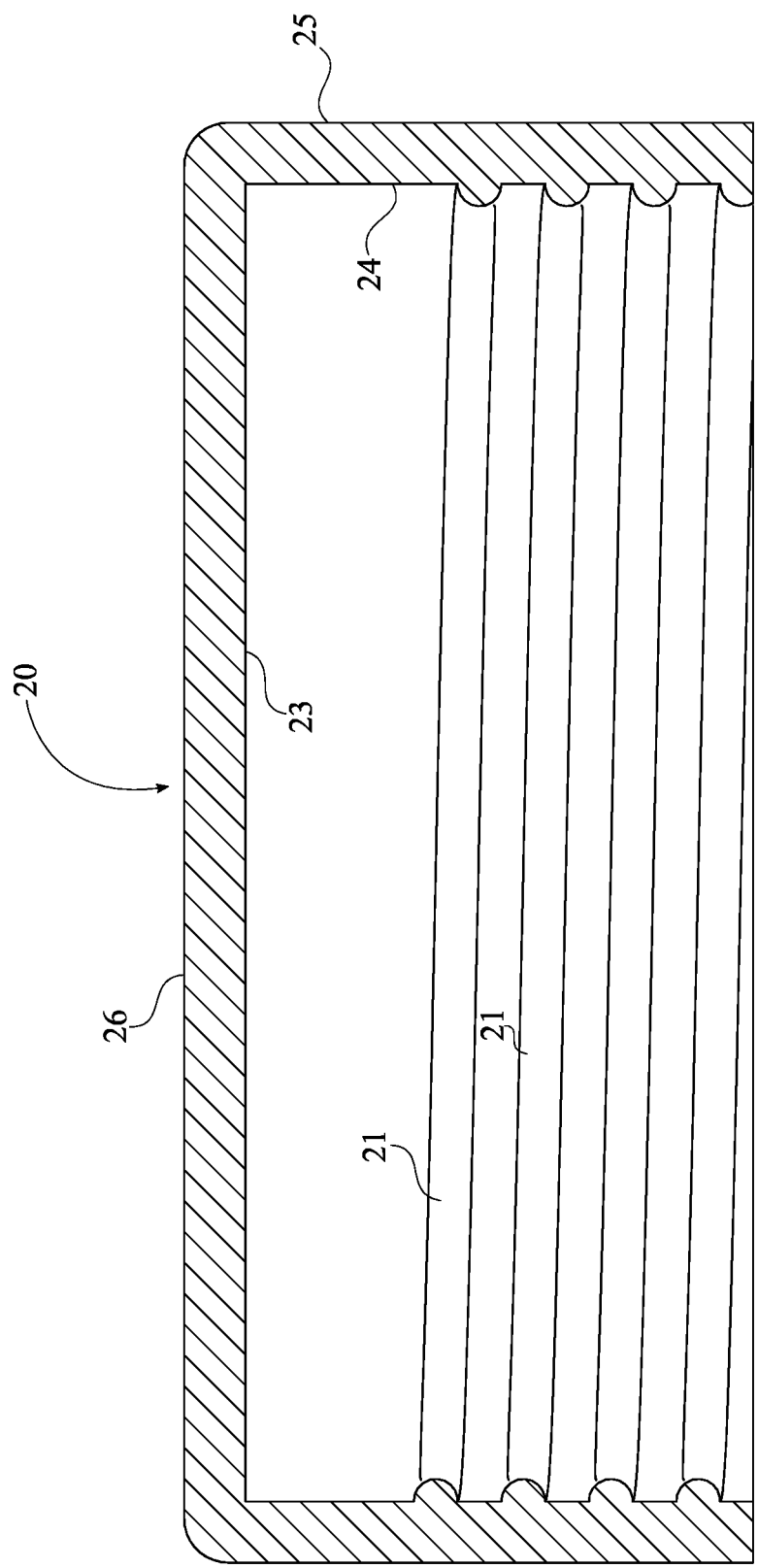
FIG. 7 is a left-side sectional view of the cap of the present invention taken along line A-A in FIG. 6.
Figure 8:
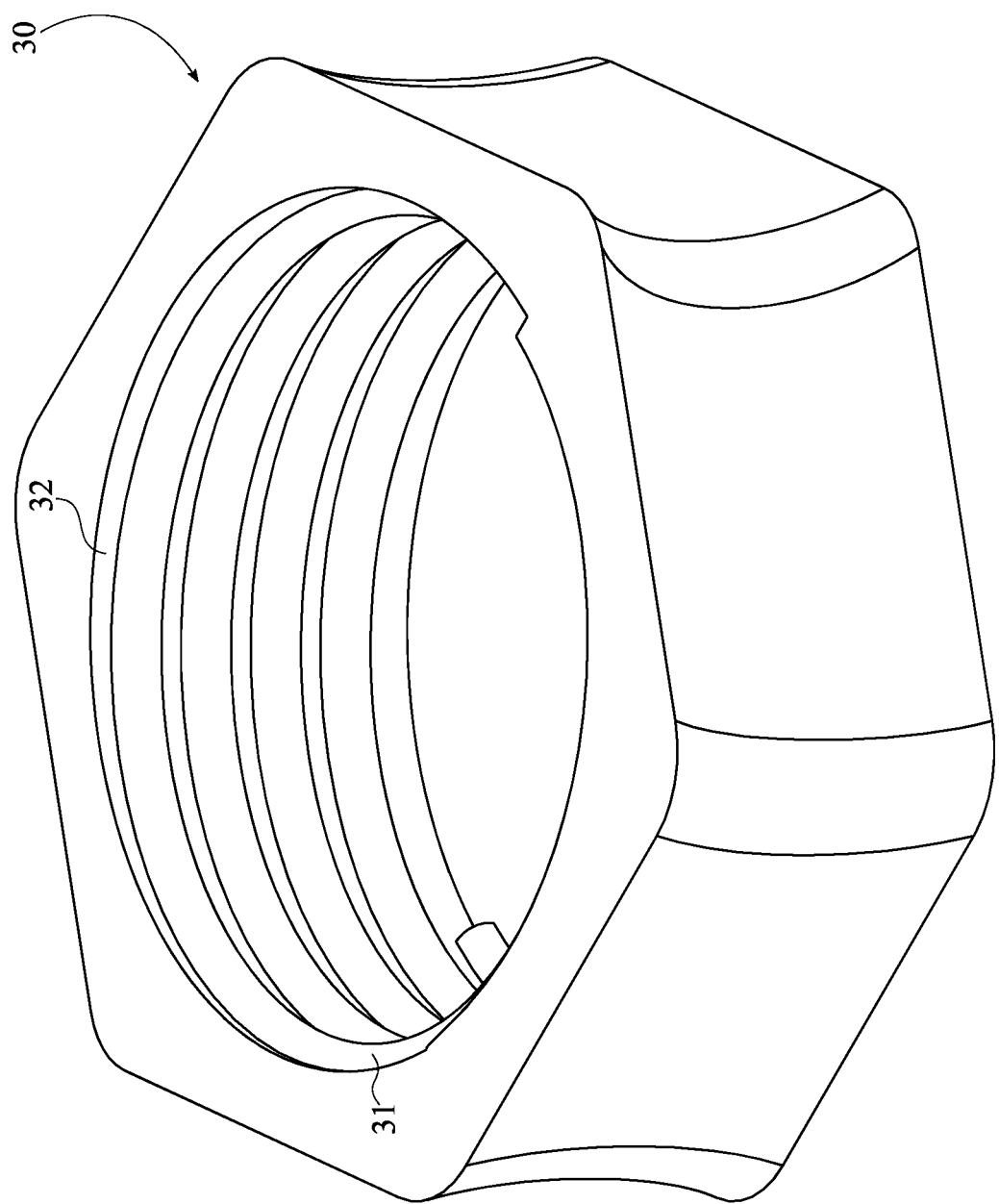
FIG. 8 is a perspective view of the spacer of the present invention.
Figure 9:
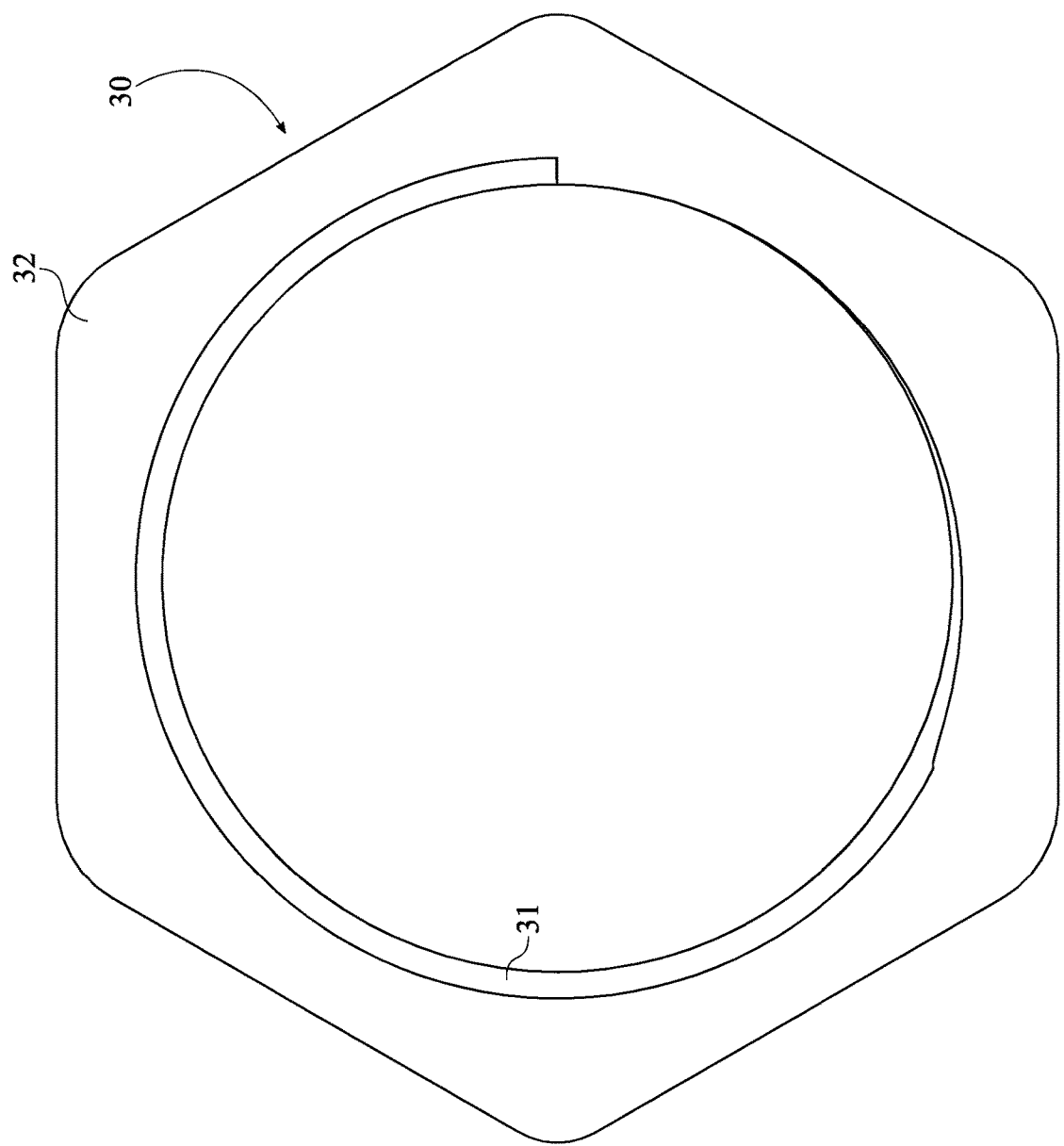
FIG. 9 is a top and/or bottom view of the spacer of the present invention.
Figure 10:
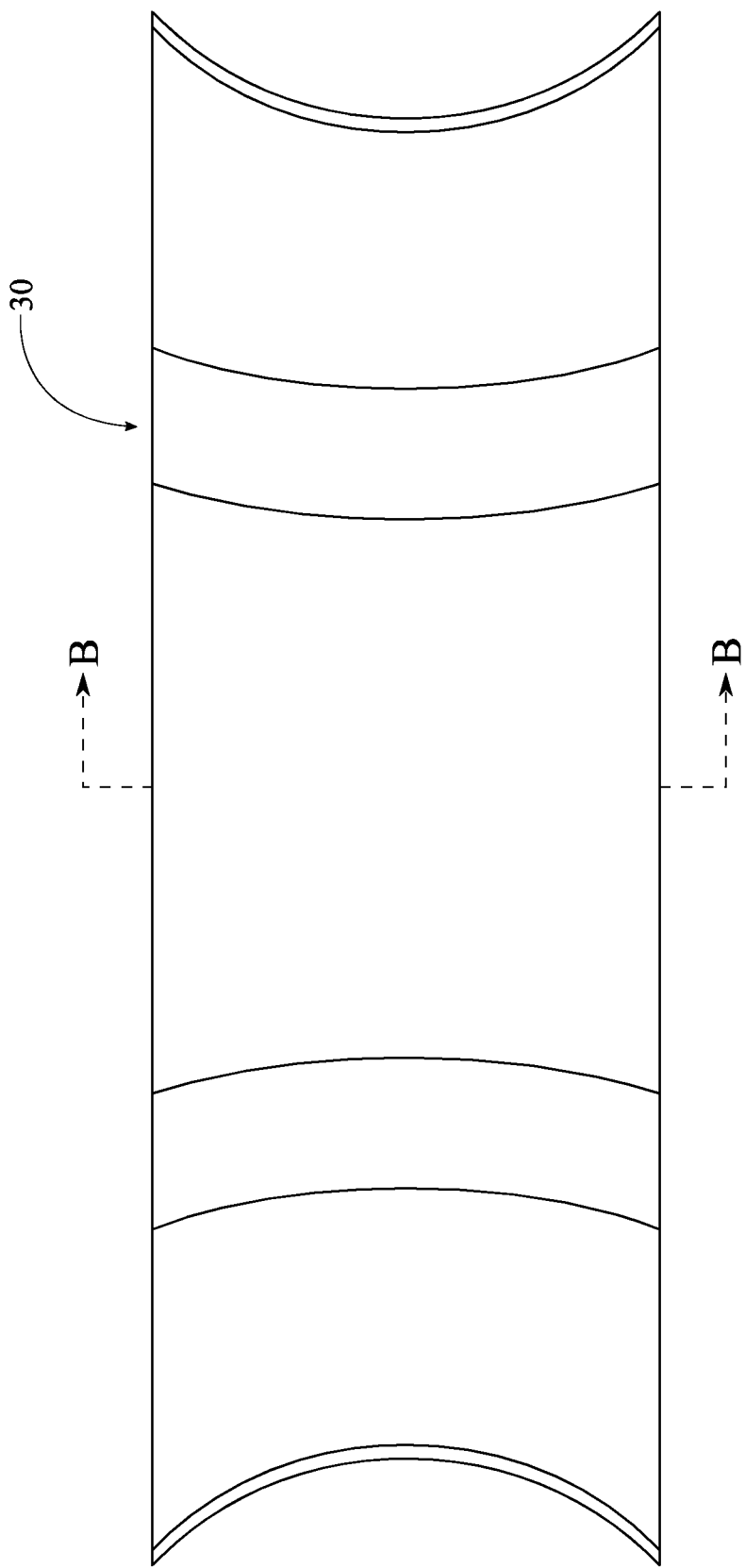
FIG. 10 is a front view of the spacer of the present invention indicating the direction of section cut B.
Figure 11:
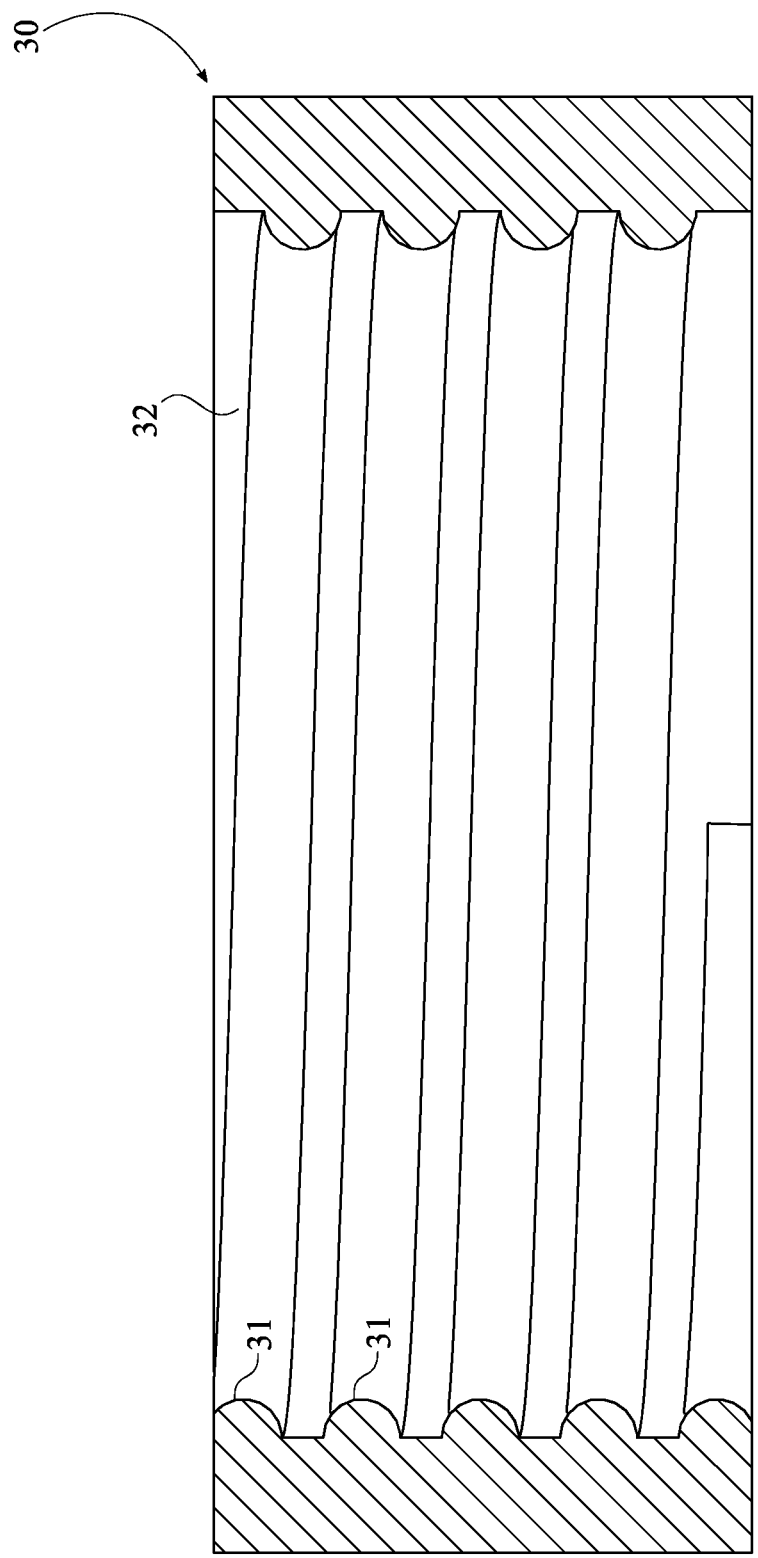
FIG. 11 is a left-side sectional view of the spacer of the present invention taken along line B-B in FIG. 10.

As seen in FIG. 6 through FIG. 7, the present invention comprises the cap 20. The cap 20 comprises a third thread 21, at least one illustration 22, an interior face 23, an inner lateral surface 24, an outer lateral surface 25, an exterior face 26, and a finish 27. Specifically, the cap 20 of the present invention can be of any shape, size, material or materials, features, type or kind, components, and arrangements of components that would allow the present invention to fulfill the objectives and intents of the present invention. However, it is preferred that the cap 20 be of a material or materials similar to the material or materials of the screw 10. Also, it is preferred that the cap 20 is of a size that allows the cap 20 to be applied to the head 11 of the screw 10. Also, it is preferred that the cap 20 be of a shape similar to a hollow, short cylinder with an open exposed face on the bottom, opposite the interior face 23 of the cap 20. However, although the outer lateral surface 25 of the cap 20 can be of any shape and size that allows the present invention to fulfill the objectives and intents of the present invention, the inner lateral surface 24 of the cap 20 should be of a shape and size similar to the outer lateral surface 25 of head 11 of the screw 10. The third thread 21 of the cap 20 can be of any shape, size, material or materials, features, type or kind, components, and arrangements of components that would allow the present invention to fulfill the objectives and intents of the present invention. However, the third thread 21 is positioned on the inner lateral surface 24 of the cap 20. Also, it is preferred that the third thread 21 of the cap 20 be of shape and size that allows the third thread 21 to be engaged with the second thread 111 of the head 11 such that the cap 20 can be removably attached to the head 11 of the screw 10. In some embodiments, the at least one illustration 22 of the cap 20 can be of any shape, size, feature, component, and arrangement of components that allow the present invention to fulfill the objectives and intents of the present invention. The at least one illustration 22 of the cap 20 is terminally positioned on the outer lateral surface 25 and/or exterior face 26 of the cap 20 and can include, but is not limited to, custom designs, team mascots, logos, characters, symbols, and other 2-D objects that can be printed or drawn on the outer lateral surface 25 of the cap 20 as seen in FIG. 6 and FIG. 12. In other embodiments of the present invention, the cap 20 can comprise a finish 27 on the external face 26 and outer lateral surface 25. The finish 27 can be of any type or kind, which can include, but is not limited to, the following: chrome, polished finish, brushed nickel, brass, mirrored finish, and other similar types or kinds of finishes and or textures. Further, in alternative embodiments of the present invention, the cap 20 can comprise a variety of different kinds of attachments that can include, but is not limited to, hooks, clips, and brackets, etc. Further, in other embodiments of the present invention, the cap 20 can be magnetic.

As seen in FIG. 8 through FIG. 11, the present invention comprises the spacer 30. The spacer 30 of the present invention comprises a fourth thread 31 and an inner lateral surface 32. The spacer 30 can be of any shape, size, material, features, type or kind, components, and arrangements of components that would allow the present invention to fulfill the objectives and intents of the present invention. However, it is preferred that the spacer 30 be of a material similar to the material of the present invention. Also, it is preferred that the spacer 30 be of a size that allows the spacer 30 to be attached to the shaft 12 of the screw 10. Specifically, the inner diameter of the spacer 30 is similar to the outer diameter of the shaft 12 of the screw 10. Also, it is preferred that the spacer 30 be of an outer diameter that is either similar to or smaller than the outer diameter of the second thread 111 of the head 11 of the screw 10. It is preferred that the spacer 30 be of shape similar to a concave cylinder that is hollow and open-faced at both ends of the spacer 30. In some embodiments of the present invention, the spacer 30 can assume the shape of a concave, hexagonal cylinder that is hollow and open-faced at both ends of the present invention. The fourth thread 31 is positioned on the inner lateral surface 32 of the spacer 30 and can be of any shape, size, material, features, type or kind, components, and arrangements of components that can allow the present invention to fulfill the objectives and intents of the present invention. However, it is preferred that the fourth thread 31 be of a shape, size, type or kind, feature, that allows the fourth thread 31 to be engaged with the first thread 121 of the shaft 12 such that the spacer 30 can be terminally and concentrically attached to the shaft 12 of the screw 10, adjacent to the cap 20 and the head 11 of the screw 10.

As can be seen in FIG. 12 through FIG. 16, the present invention comprises the adaptor 40. The adaptor 40 can be of any shape, size, material, features, kind or type, component, and arrangement of components that allows the present invention to fulfill the objectives and intents of the present invention. However, it is preferred that the adaptor 40 be of a material similar to the material of the present invention. Also, it is preferred that the adaptor 40 be of shape similar to a ring-like cylinder. It is preferred that adaptor 40 be of a size that allows the inner diameter of the adaptor 40 to be similar to the outer diameter of the head 11 of the screw 10. Also, it is preferred that the adaptor 40 be of a size that allows the height of the adaptor 40 to be similar to or less than the thickness of the head 11 of the screw 10. The outer diameter of the adaptor 40 can be of any size such that it allows for the cap 20 of the present invention that is of a size substantially larger than the preferred embodiment of the cap 20 of the present invention. The adaptor 40 comprises a fifth thread 41, a sixth thread 42, an inner lateral surface 43, and an outer lateral surface 44. The fifth thread 41 and the sixth thread 42 can be of any shape, size, material, feature, type or kind, component, and arrangement of components. However, it is preferred that the fifth thread 41 be positioned on the inner lateral surface 43 of the adaptor 40, while the sixth thread 42 is positioned on the outer lateral surface 44 of the adaptor 40. Also, it is preferred that the fifth thread 41 be of a shape, size, type or kind, and feature that allows the fifth thread 41 to be engaged with the second thread 111 of the head 11 such that the adaptor 40 can be attached to the head 11 of the screw 10. Additionally, it is preferred that the sixth thread 42 is of a shape, size, features, and kind or type that would allow the sixth thread 42 to be engaged with the third thread 21 of another embodiment of the cap 20 such that the said other embodiment of the cap 20 can be attached to the adaptor 40. Further, in other embodiments of the present invention, the adaptor 40 can be magnetic.

Although the invention has been explained in relation to its preferred embodiment, it is to be understood that many other possible modifications and variations can be made without departing from the spirit and scope of the invention as hereinafter claimed.

What is claimed is:

1. An aesthetic fastener for fixing and hanging items comprising:
    a screw;
    a cap;
    a spacer;
    the screw comprising a shaft and a head;
    the shaft and head being terminally and concentrically connected to each other;
    the shaft comprising a first thread;
    the head comprising a second thread, a screw drive and a top face;
    the screw drive positioned on the top face of the head;
    the cap comprising a third thread and an inner lateral surface;
    the third thread being positioned on the inner lateral surface of the cap;
    the cap being removably attached to the head of the screw;
    the spacer comprising a fourth thread and an inner lateral surface;
    the fourth thread being terminally positioned on the inner lateral surface of the spacer;
    the spacer being terminally and concentrically attached to the shaft of the screw;
    the cap being removably attached to the head of the screw with the third thread of the cap being engaged with the second thread of the head of the screw;
    the spacer being terminally and concentrically attached to the shaft of the screw with the fourth thread of the spacer being engaged with the first thread of the shaft of the screw, adjacent to the cap and the head of the screw; and
    the spacer having a hexagonal concave cylinder shape.

2. The aesthetic fastener for fixing and hanging items as claimed in claim 1 comprising:
    an adaptor;
    the adaptor comprising a fifth thread, a sixth thread, an inner lateral surface, and an outer lateral surface;
    the fifth thread being positioned on the inner lateral surface of the adaptor;
    the sixth thread being positioned on the outer lateral surface of the adaptor;
    the fifth thread of the adaptor being engaged with the second thread of the head of the screw; and
    the sixth thread of the adaptor being engaged with the third thread of the cap.

3. The aesthetic fastener for fixing and hanging items comprising as claimed in claim 2, wherein the adaptor is magnetic.

4. The aesthetic fastener for fixing and hanging items as claimed in claim 1 comprising:
    the cap comprising an exterior face, an outer lateral surface, and at least one illustration; and
    the at least one illustration being terminally positioned on the exterior face of the cap and/or outer lateral surface of the cap.

5. The aesthetic fastener for fixing and hanging items as claimed in claim 4 comprising:
    the exterior face of the cap comprising a finish; and
    the outer lateral surface of the cap comprising a finish.

6. The aesthetic fastener for fixing and hanging items as claimed in claim 1, wherein the head of the screw is magnetic.

7. The aesthetic fastener for fixing and hanging items comprising as claimed in claim 1, wherein the cap is magnetic.

* * * * *